Patented Sept. 20, 1949

2,482,511

UNITED STATES PATENT OFFICE 2,482,511

PROCESS OF MANUFACTURING BIS-4-HYDROXY-COUMARIN ESTERS

Jan Rosický, Prague, Czechoslovakia, assignor to Spojene farmaceuticke zavody, narodni podnik, Prague, Czechoslovakia No Drawing. Application February 14, 1947, Serial No. 728,715. In Switzerland November 6, 1945

Section 1, Public Law 690, August 8, 1946
Patent expires November 6, 1965

3 Claims. (Cl. 260—344.6)

In my co-pending United States patent application, Serial Number 728,714, filed on February 14, 1947, I have disclosed a process of manufacturing a derivative of the benzotetronic acid which reduces the prothrombin level of the blood.

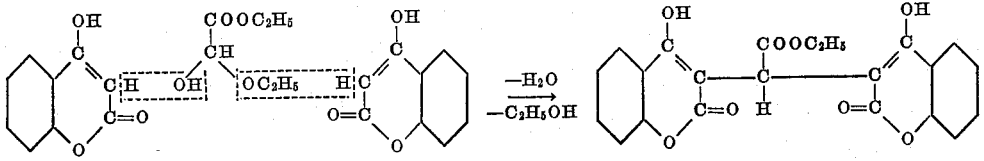

For the manufacturing of this compound, the ethyl ester of the glyoxylic acid is condensed with benzotetronic acid or 4-hydroxy-coumarin.

The compounds disclosed, such as 3,3'-carboxymethylenebis-(4-hydroxycoumarin) ethyl ester, are characterized by their quick action on the prothrombin level, which sets in already after two to three hours after administration, and also, thereafter, by their quick elimination from the organism. The physician by properly dosing these compounds may thus keep the prothrombin level of the blood elastically on the desired height, a fact which is of great importance for the practical application of these compounds in therapeutics.

The object of this invention is a new and improved process for the manufacture of the 3,3' carboxymethylenebis-(4-hydroxycoumarin) ethyl ester which enhance the smooth course of the reaction and produce a higher yield by avoiding side reactions, particularly polymerization.

I have discovered that this object is attained at, if in accordance with my invention, I employ instead of glyoxylic acid ethyl ester, the glyoxylic acid ethyl ester ethyl alcoholate.

Since the alcoholate is an addition compound of one alcohol molecule and one molecule of the glyoxylic acid ester, the two components, during the condensation reaction, are readily separated from one another while the condensation takes place. The glyoxylic acid ester alcoholate thus acts as a vehicle which facilitates the course of the condensation and which while enhancing the linking of the glyoxylic acid ethyl ester with the tetronic acid or bis-4-hydroxy coumarin, releases its alcohol molecule.

The condensation may be carried out in the presence of a solvent, at elevated temperature, such as water at boiling temperature, or acetone.

The condensation product, produced by the reaction between benzotetronic acid and glyoxylic acid ethyl ester ethyl alcoholate, will remain unchanged when heated with alcoholic potassium. When heated to 230° C., carbon dioxide will escape and the residue will melt not below 300° C., which is conclusive of the fact that condensation has taken place.

The reaction between two molecules of benzotetronic acid and one molecule of glyoxylic acid ethyl ester ethyl alcoholate is as follows:

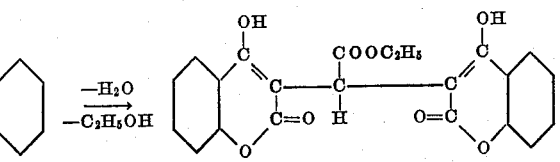

An interesting phenomenon was observed when the melting point of the condensation product, 3,3' - carboxymethylenebis-(4-hydroxycoumarin) ethyl ester, was determined. The product as first obtained melts at 172 to 174° C. When the product is recrystallized from dilute acetic acid, this melting point remains unchanged; if crystallized from methyl alcohol, the melting point decreases to 153 to 154° C.

This product of lower melting point may be reconverted by recrystallization into the product of higher melting point.

The product acts as a weak acid and is soluble in a bicarbonate solution and in alkalis, wherefrom it may be reprecipitated by means of hydrochloric acid.

The effect of this product in animal tests has been described in my aforesaid patent application, Serial Number 728,714. As set forth therein, when the product is administered per os to a rabbit in a dose of 5 milligrams per kilogram of weight of the rabbit, the decrease of the blood prothrombin starts already within a short while and reaches the lowest level in the average within 18 hours, the titre moving between 20 to 30% of the normal value, determined by Quick's method.

Histological tests of organs did not show any changes, solely an accumulation of glycogen in the tissue of the liver. Particularly, after administration during an extended period of time, no damage to the capillaries was observed, in contrast with the administration of methylene-bis-4-oxycoumarin where such damages have been observed.

The following example will illustrate the manufacture of the compounds of the invention. It will be readily understood however that these examples are illustrative of the invention but not limitative of its scope.

Example 7 gm. of benzotetronic acid are dissolved in 750 cc. of water at boiling temperature and thereafter 10.5 gm. of glyoxylic acid ethyl ester ethyl alcoholate are added. After a short while the liquid becomes turbid and gradually a white deposite is separated. The deposit is filtrated and dried in vacuo. The melting point is 172 to 174° C.; after recrystallization from methyl alcohol 153 to 154° C.

The crude product is dissolved in sodium lye, filtrated by means of animal charcoal, precipitated by means of hydrochloric acid, and recrystallized from methyl alcohol. Melting point 153 to 154° C.

I claim:

1. The process of manufacturing the ethyl ester of 3,3' - carboxymethylenebis - (4 - hydroxycoumarin) which includes the step of condensing benzotetronic acid with glyoxylic acid ethyl ester ethyl alcoholate.

2. The process as set forth in claim 1 which includes the step of reacting the reagents at elevated temperature.

3. The process of manufacturing a 3,3'-carboxymethylene - bis-(4-hydroxycoumarin) ester which includes the steps of condensing benzotetronic acid with glyoxylic acid ethyl ester ethyl alcoholate, purifying the condensation product by dissolving it in an alkali, precipitating it by means of an acid, and recrystallizing it.

JAN ROSICKÝ.

REFERENCES CITED

The following references are of record in the file of this patent:

Sullivan et al.: Journal of the Amer. Chem. Society, vol. 65, Dec. 1943, pages 2288–2291.